(12) United States Patent  
Waagen et al.

(10) Patent No.: US 11,106,989 B1  
(45) Date of Patent: Aug. 31, 2021

(54) STATE TRANSITION NETWORK ANALYSIS OF MULTIPLE ONE-DIMENSIONAL TIME SERIES

(71) Applicant: HRL Laboratories, LLC, Malibu, CA (US)

(72) Inventors: Alex N. Waagen, Agoura Hills, CA (US); Tsai-Ching Lu, Thousand Oaks, CA (US); Jiejun Xu, Chino, CA (US)

(73) Assignee: HRL Laboratories, LLC, Malibu, CA (US)

( * ) Notice: Subject to any disclaimer, the term of this patent is extended or adjusted under 35 U.S.C. 154(b) by 850 days.

(21) Appl. No.: 15/912,209

(22) Filed: Mar. 5, 2018

Related U.S. Application Data

(60) Provisional application No. 62/478,529, filed on Mar. 29, 2017.

(51) Int. Cl.

| | |
|---|---|
| *G06N 7/00* | (2006.01) |
| *G06N 5/02* | (2006.01) |
| *G06N 5/04* | (2006.01) |
| *G06F 9/448* | (2018.01) |
| *G06F 16/2458* | (2019.01) |
| *G06F 16/901* | (2019.01) |
| *G06Q 50/00* | (2012.01) |

(52) U.S. Cl.  
CPC .......... *G06N 7/005* (2013.01); *G06F 9/4498* (2018.02); *G06F 16/2477* (2019.01); *G06F 16/9024* (2019.01); *G06N 5/022* (2013.01); *G06N 5/04* (2013.01); *G06Q 50/01* (2013.01)

(58) Field of Classification Search  
None  
See application file for complete search history.

(56) References Cited

U.S. PATENT DOCUMENTS

2014/0136186 A1* 5/2014 Adami ............. H04N 21/47217  
704/9

* cited by examiner

*Primary Examiner* — David R Vincent  
(74) *Attorney, Agent, or Firm* — Tope-McKay & Associates

(57) ABSTRACT

Described is a system for predicting an occurrence of large-scale events using social media data. A collection of time series is acquired from social media data related to an event of interest. The collection of time series is partitioned into time intervals and semantic features are extracted from the time intervals as a set of semantic intervals. The semantic features are encoded into a multilayer network. Subgraphs of the multilayer network are transformed into a state transition network. A prediction of a future event of interest is generated by analyzing the encoded network using the state transition network. Using the analyzed encoded network, a device is controlled based on the prediction of the future event of interest.

20 Claims, 16 Drawing Sheets  
(2 of 16 Drawing Sheet(s) Filed in Color)

| | | |
|---|---|---|
| 400 ~ $E_1$ ——<br>$E_2$ —— | $E_1$ before $E_2$ | $E_2$ after $E_1$ |
| 402 ~ $E_1$ ——<br>$E_2$ —— | $E_1$ meets $E_2$ | $E_2$ is met by $E_1$ |
| 404 ~ $E_1$ ——<br>$E_2$ —— | $E_1$ overlaps $E_2$ | $E_2$ is overlapped by $E_1$ |
| 406 ~ $E_1$ ——<br>$E_2$ —— | $E_1$ is finished by $E_2$ | $E_2$ finishes $E_1$ |
| 408 ~ $E_1$ ——<br>$E_2$ —— | $E_1$ contains $E_2$ | $E_2$ during $E_1$ |
| 410 ~ $E_1$ ——<br>$E_2$ —— | $E_1$ starts $E_2$ | $E_2$ is started by $E_1$ |
| 412 ~ $E_1$ ——<br>$E_2$ —— | $E_1$ equals $E_2$ | $E_2$ equals $E_1$ |

FIG. 4

STATE TRANSITION NETWORK ANALYSIS OF MULTIPLE ONE-DIMENSIONAL TIME SERIES

CROSS-REFERENCE TO RELATED APPLICATIONS

This is a Non-Provisional patent application of U.S. Provisional Application No. 62/478,529, filed in the United States on Mar. 29, 2017, entitled, "State Transition Network Analysis of Multiple One-Dimensional Time Series," the entirety of which is hereby incorporated by reference.

BACKGROUND OF INVENTION

(1) Field of Invention

The present invention relates to a system for encoding semantic information from a collection of time series as a multilayer network and, more particularly, to a system for encoding semantic information from a collection of time series as a multilayer network for state transition network analysis.

(2) Description of Related Art

Visibility networks may be used to analyze individual time series in a similar way using a state transition network (see Literature Reference No. 1 in the List of Incorporated Literature References). Visibility networks can be used to simplify complicated time series information, but they have several disadvantages. For instance, visibility networks do not generalize to multiple/multidimensional time series. Furthermore, they do not account for different time scales and do not specifically encode semantic features of interest. Additionally, visibility networks treat every piece of data the same way. Moreover, recurrence networks (as described in Literature Reference No. 4) and coarse-graining methods (described in Literature Reference No. 5) can be used to encode multiple time series, but lack the ability to encode semantic features.

Thus, a continuing need exists for a method of encoding specific semantic features that may be specialized to specific datasets and account for multiple time scales.

SUMMARY OF INVENTION

The present invention relates to a system for encoding semantic information from a collection of time series as a multilayer network and, more particularly, to a system for encoding semantic information from a collection of time series as a multilayer network for state transition network analysis. The system comprises one or more processors and a non-transitory computer-readable medium having executable instructions encoded thereon such that when executed, the one or more processors perform multiple operations. The system generates a collection of time series from social media data related to an event of interest. The collection of time series is partitioned into a set of time intervals, and semantic features are extracted from the set of time intervals as a set of semantic intervals. The semantic features are encoded into a multilayer network, resulting in an encoded network. A set of subgraphs of the multilayer network are transformed into a state transition network. The encoded network is analyzed using the state transition network. Using the analyzed encoded network, an alert related to a prediction of a future event of interest is generated.

In another aspect, each layer of the multilayer network represents a distinct time series, and wherein the multilayer network comprises nodes, which each represent an event of interest, and colored edges, wherein different colored edges represent different time-scales.

In another aspect, in encoding the semantic features into the multilayer network, the system defines a node in the multilayer network for each semantic interval. A timestamp is assigned to each semantic interval. Timestamps of each pair of nodes are compared to determine a difference in timestamps between the pair of nodes. Each pair of nodes is linked with an edge having a color determined based on the difference in timestamps.

In another aspect, in transforming a set of subgraphs of the multilayer network into a state transition network, the system divides the multilayer network into a set of time intervals. A subgraph of the multilayer network restricted to each time interval is generated, wherein each subgraph is comprised of nodes and edges linking the nodes. For each subgraph, a number of edges of each type is determined. The number of edges is compared against a threshold value, and a state is assigned to each subgraph. The state transition network is generated, wherein each state is represented by a state node and each transition from one state to another is represented by an edge.

In another aspect, a number of occurrences of a state determines a size of the state node in the state transition network, and a number of transitions determines a size of a corresponding edge in the state transition network.

In another aspect, using the state transition network, a random walker method with memory is used to probabilistically select a next state in the encoded network to yield a prediction of a future event of interest.

In another aspect, the alert is sent electronically via at least one of email, text message, and a social media network.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 4 is a table illustrating Allen's temporal relations according to some embodiments of the present disclosure;

DETAILED DESCRIPTION

Figure 1:
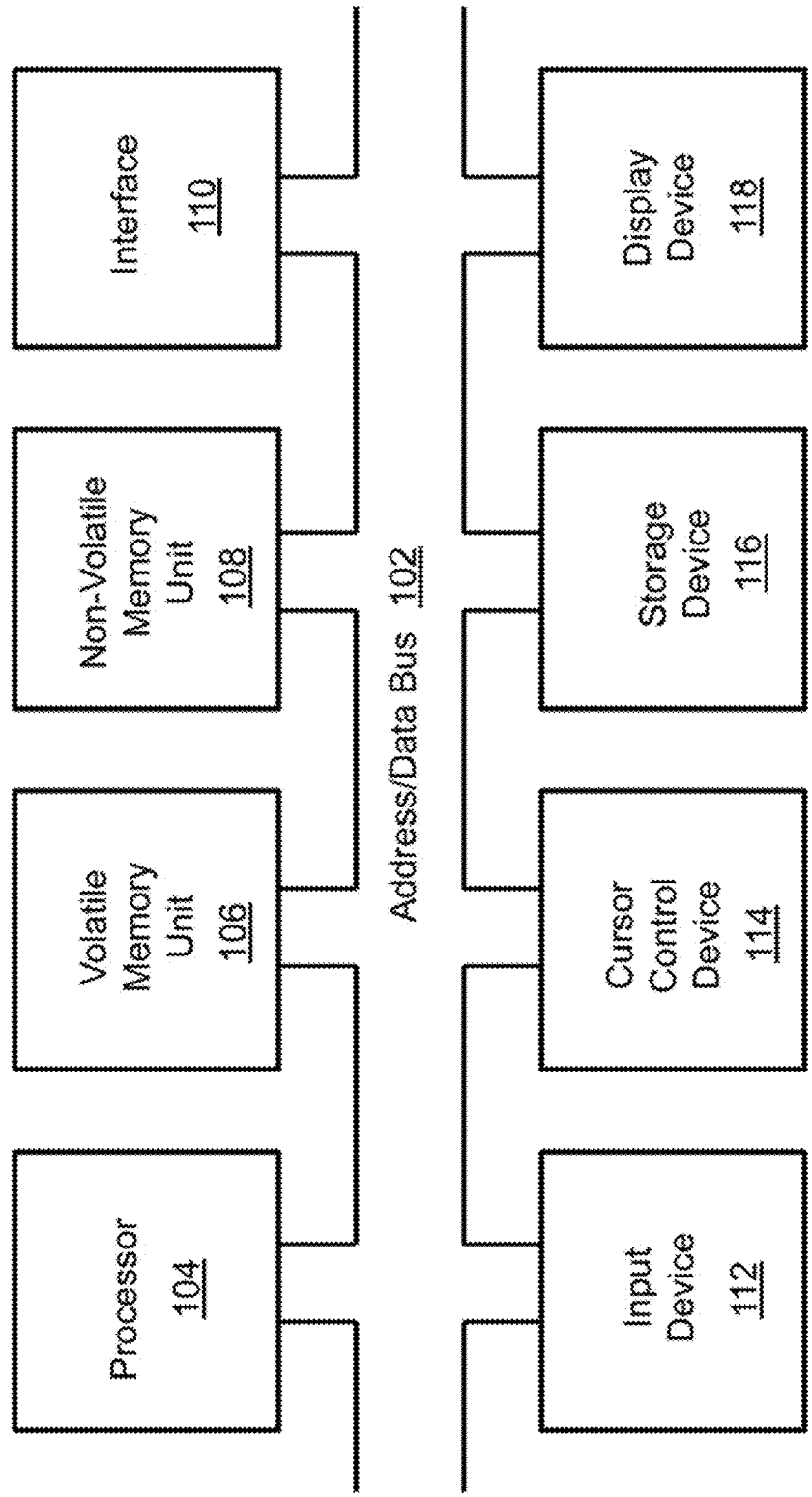
FIG. 1 is a block diagram depicting the components of a system for encoding semantic information for state transition network analysis according to some embodiments of the present disclosure.

The present invention relates to a system for encoding semantic information from a collection of time series as a multilayer network and, more particularly, to a system for encoding semantic information from a collection of time series as a multilayer network for state transition network analysis. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Stephen, Mutua, Changgui Gu, and Huijie Yang. "Visibility" graph based time series analysis." PloS one 10.1 (2015): e0143015.
2. Lacasa, Lucas, et al. "From time series to complex networks: The visibility graph." Proceedings of the National Academy of Sciences 105.13 (2008): 4972-4975.
3. Iacovacci, Jacopo, and Lucas Lacasa. "Sequential visibility-graph motifs." Physical Review E 93.4 (2016): 042309,
4. Donner, Reik V., et al. "Recurrence networks? A novel paradigm for nonlinear time series analysis." New Journal of Physics 12.3 (2010): 033025.
5. Gao, Zhong-Ke, et al. "Multiscale complex network for analyzing experimental multivariate time series." EPL (Europhysics Letters) 109.3 (2015): 30005.
6. Balcan, Duygu, et al. "Multiscale mobility networks and the spatial spreading of infectious diseases." Proceedings of the National Academy of Sciences 106.51 (2009): 21484-21489.
7. Allen, James F. "Maintaining knowledge about temporal intervals." Communications of the ACM. ACM Press (1983): 832-843.

(2) PRINCIPAL ASPECTS

Various embodiments of the invention include three "principal" aspects. The first is a system for encoding semantic information for state transition network analysis. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
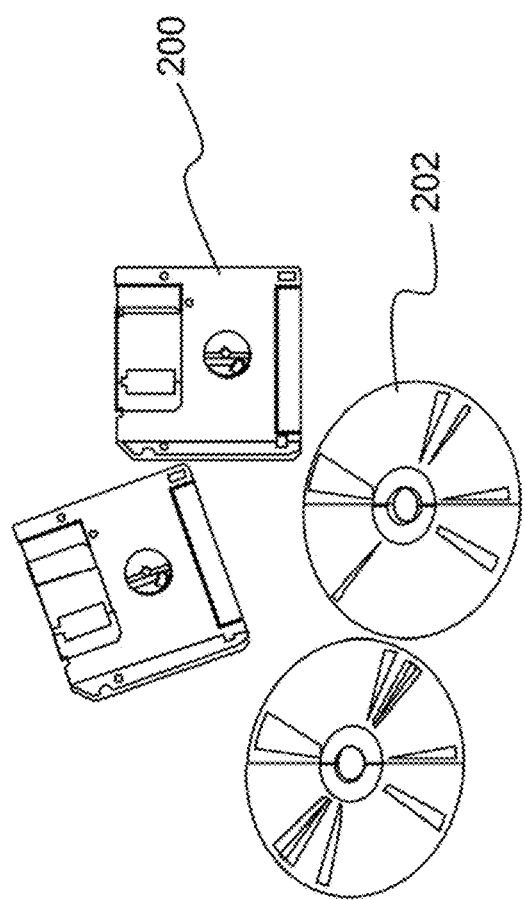
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a system and method for encoding semantic information from a collection of time series as a multilayer network, and for analyzing the encoded network via a state transition network. One purpose of the invention is to characterize the occurrence of rare, large scale events through analysis of semantic abstractions in data. The semantic abstractions consist of a collection of time series from which a multilayer network is built whose subgraphs are analyzed and transformed into a state transition network. The state transition network can be used to model and predict behavior of the underlying system. Some non-limiting examples of systems that can be modeled include online social networks, such as Twitter, human mobility networks, and economic networks. For each of these, it is desirable to predict large scale events, such as nationwide protests, epidemics, and recessions, respectively.

The system described herein extends the method of analyzing time series via a state transition network in a non-obvious way to a higher dimension by changing the method by which the time series are encoded to a network. Instead of using a visibility-based method, semantic information is encoded at multiple time scales to more directly represent the dynamics of an underlying spreading process. In other words, a collection of times series is encoded rather than a single time series. Many methods for encoding time series to a network, such as visibility graphs (see Literature Reference Nos. 2 and 3), only apply to individual time series. The system according to embodiments of the present disclosure accounts for multiple time scales and encodes semantic features instead of abstracting the time series directly, allowing for more specialization and adaptation to particular purposes.

Due to the method of encoding specific semantic features, the technique described herein may be specialized to specific datasets. In particular, the percolation processes underlying opinion diffusion or disease can be encoded from a collection of time series into a multilayer network and modeled via state transitions.

The input to the system described herein is a collection of related time series, a non-limiting example of which is protest data, which can be collected from Twitter, or other online media sources, by scraping all tweets containing a protest-related hashtag. Most of these tweets can be geo-coded to a particular city, and using this geocoding one can construct a time series of the number of protest-related tweets occurring in each city on each day. In one embodiment, this collection of time series is encoded as a multilayer directed network with colored edges, which tracks the geographical spread of activity over time. As can be appreciated by one skilled in the art, since edges represent different time scales, it is necessary to distinguish types of edges via coloring or another type of labeling, unless only a single time scale is used.

Figure 3:
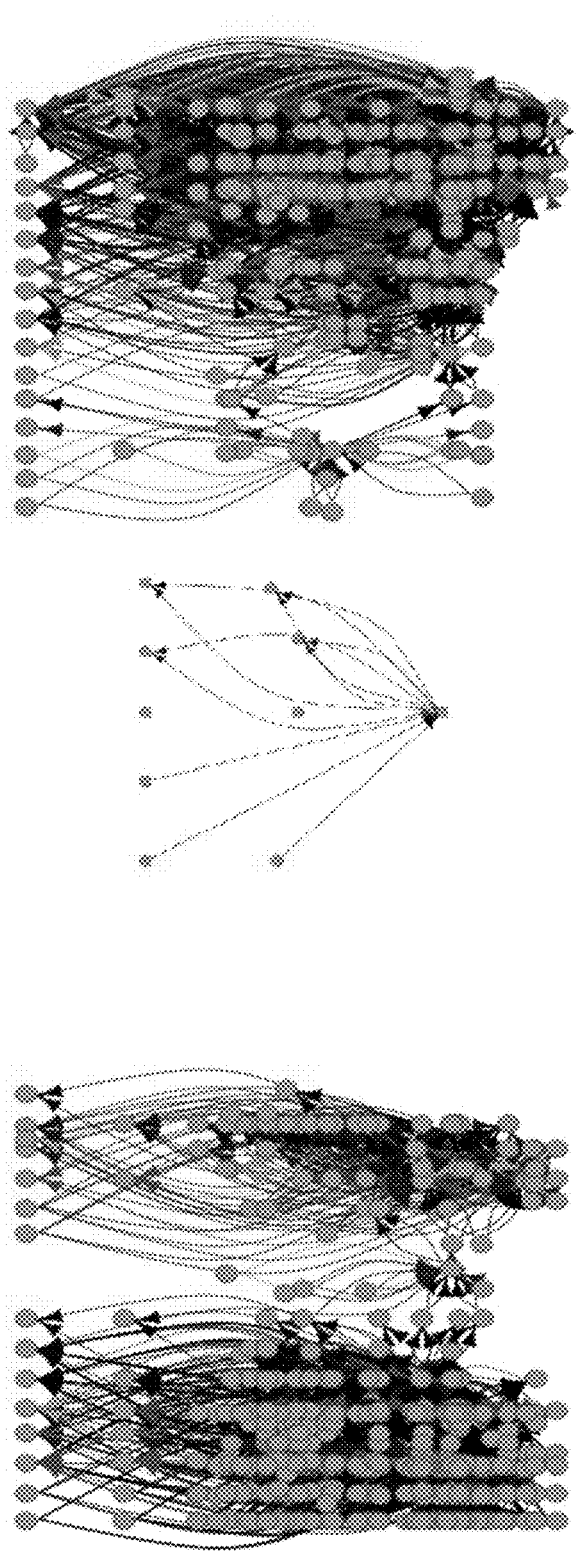
FIG. 3 is an illustration of a multilayer network formed from Brazil protest Twitter data according to some embodiments of the present disclosure.

FIG. 3 depicts an example multilayer network formed from Brazil protest Twitter data. Different colored edges represent different time-scales, with red edges representing a fast spread with less than 1 day delay between events, and black edges representing a slow spread with a delay between 1 and 2 weeks. Green and blue edges represent delays of between 1 and 3 days and between 3 days and a week, respectively. This accounts for the fact that activity tends to spread very quickly on Twitter, but continues to spread via other networks (both online and in the real world) at a slower pace. The multilayer network according to embodiments of the present disclosure was analyzed with a state transition network in order to characterize interesting sequences of events which lead to rare occurrences or large scale emergent activity, such as a nationwide protest, a system-wide failure, or a pandemic. Thus, the system described herein provides a dramatic improvement in the technology for encoding semantic information from a collection of time series as a multilayer network, and for analyzing the encoded network via a state transition network.

(3.1) Semantic Feature Extraction

Figure 6:
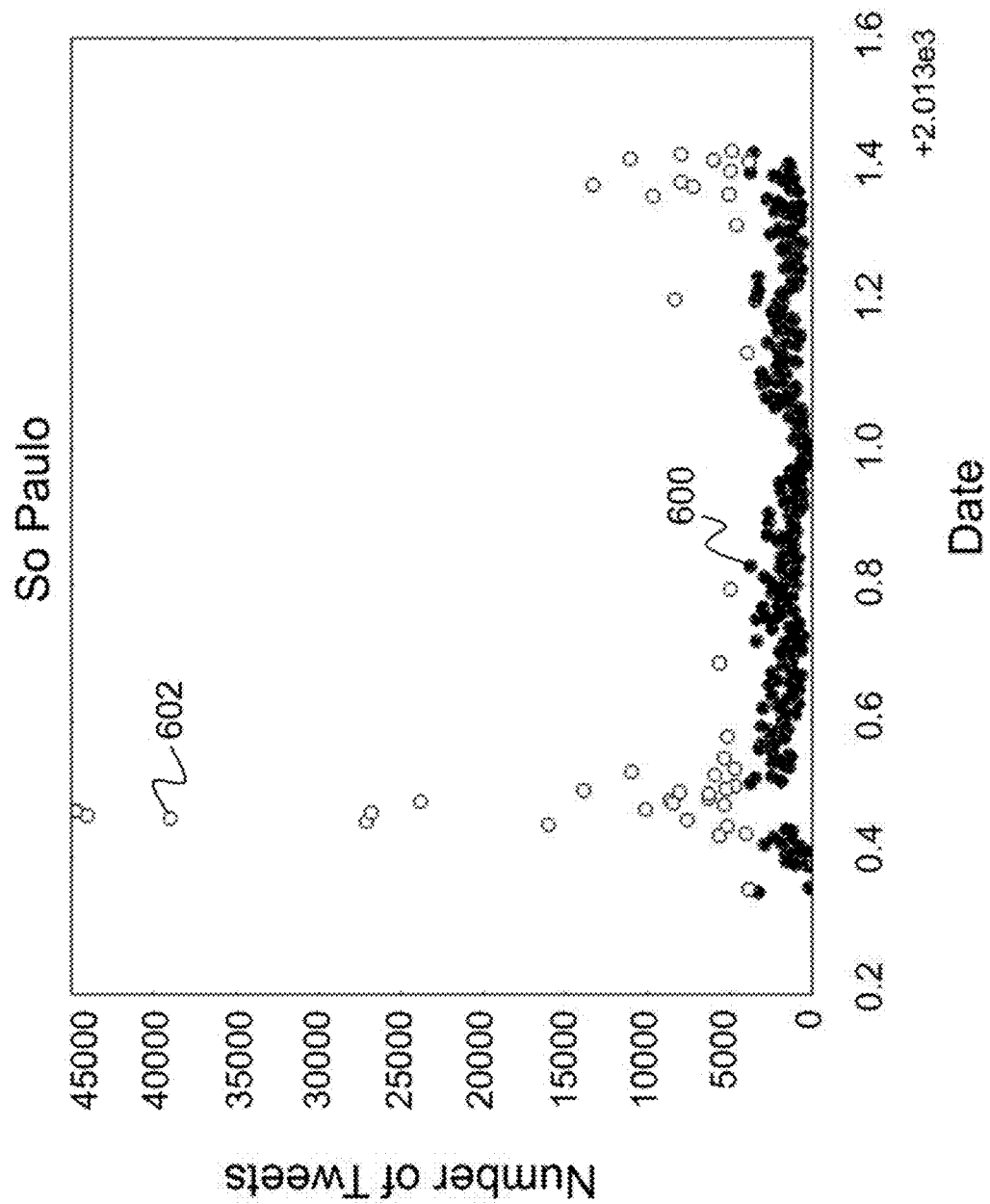
FIG. 6 is an illustration of a number of protest related tweets in Sao Paulo, Brazil in 2013 and early 2014 according to some embodiments of the present disclosure.

The first step to constructing the multilayer network is to define a collection of events and value abstractions for each time series which comprises the relevant semantic features. A value is assigned to each point in the time series of either low or high, the low points being those which are less than one standard deviation above the mean of the entire time series. FIG. 6 illustrates a number of protest related tweets in So Paulo in 2013 and early 2014. Filled dots 600 are "low" values and unfilled dots 602 are "high" values more than one standard deviation above the mean. Semantic features were extracted as the collection of time intervals in the time series in which the values are greater than one standard deviation from the mean. That is, all intervals corresponding to the unfilled points were collected.

Figure 5:
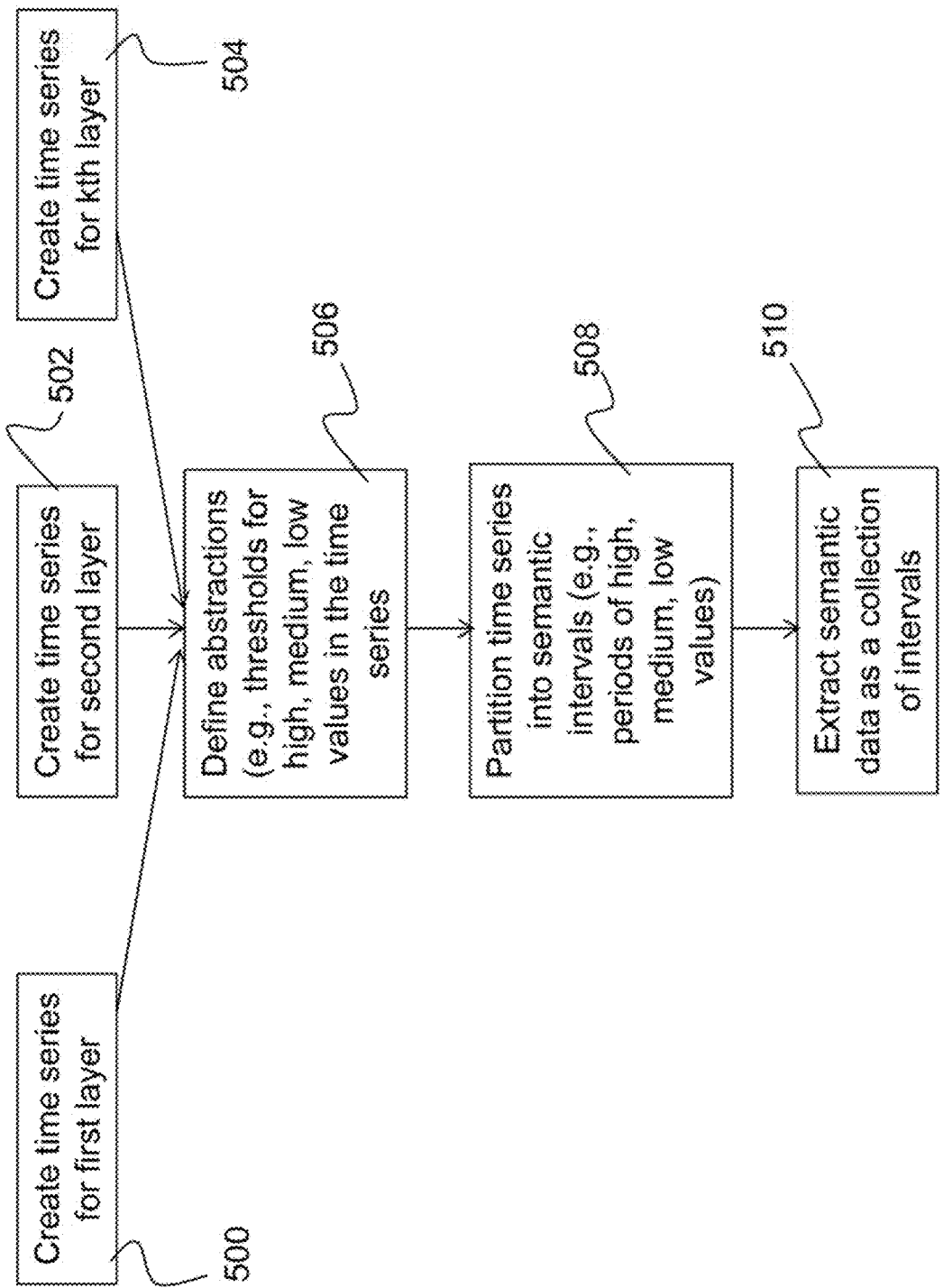
FIG. 5 is a flow diagram illustrating the process to extract semantic data from a collection of k time series according to some embodiments of the present disclosure.

FIG. 5 is a flow diagram depicting a process to extract semantic data from a collection of k time series. As described above, time series are created or acquired for a first layer (element 500), second layer (element 502), and through to a kth layer (element 504). Next, abstractions (e.g., thresholds for high, medium, and low values in the time series) are defined (element 506). Then, the time series are partitioned into semantic intervals (e.g., periods of high, medium, and low values) (element 508). Finally, semantic data is extracted as a collection of intervals (element 510).

(3.2) Allen's Temporal Relations

It is straightforward to compare the values of individual numbers, but slightly more complicated to compare intervals which comprise many different values. Allen's temporal relations (see Literature Reference No. 7) allow one to compare time intervals in a sensible manner. There are 7 relations which are enumerated in the table in FIG. 4, which include one interval before another interval (element 400), one interval meeting another interval (element 402), one interval overlapping another interval (element 404), one interval finishing another interval (element 406), one interval containing another interval (element 408), one interval starting another interval (element 410), and one interval equaling another interval (element 412).

(3.3) Additional Relations

In many scenarios, it may be beneficial to have a more fine-grained approach than that offered by Allen's temporal relations. On Twitter, for example, activity often spreads very quickly and it is important to distinguish between events which occur hours apart as opposed to days apart. Several additional relations are used, which will be used to construct a directed, colored graph. In order to define the relations, a set of parameters needs to be set. There is a collection of times:

$t_1, \ldots, t_l$ and a corresponding collection of colors $c_1, c_2, \ldots, c_l$ with $t_0$ set equal to 0.

If $E_2$ occurs after $E_1$ but the gap is less than $t_i$ but greater than $t_{i-1}$, then link $E_1$ to $E_2$ with a directed edge that is colored $c_i$.

(3.4) Defining States

The multilayer network as constructed consists of nodes which each represent events and directed, colored links which represent relations between the events as defined by the colors. Therefore, to each node an interval of time is associated in which there is relatively high activity in a city. Suppose all nodes whose intervals co-occur with a specified interval of time, for instance Jan. 1, 2015 to Jan. 10, 2015, are collected. One may preserve all relations which exist between these events, and create a subgraph on the corresponding nodes. This subgraph represents all activity occurring within that 10-day period. Therefore, if one wishes to assign states to specified periods of time, it is natural to use these subgraphs.

If there tend to be a small number of nodes, then the number of possible subgraphs may be so small that it makes sense for each distinct subgraph to represent a state. However, if there are too many distinct subgraphs, the number of distinct states will be so large that few, if any, will occur more than once. In that case it makes more sense to use properties of the subgraphs to determine the corresponding state. One possibility is to use common network measures, such as degree distribution, diameter, mixing time, and modularity. The approach according to embodiments of the present disclosure is to simply use a value abstraction of the number of links of each color. That is, the system determines whether the number of links of each color is low, medium, or high.

(3.5) State Transition Network

Suppose the events span a period of time from $T_s$ to $T_e$. In order to build a state transition network which represents this entire period of time, first break it up into intervals of fixed length $c$ and assign a state to each interval. The collection of intervals is:

$$T=\{(T_s,T_s+c),(T_s+c,T_s+2c),\ldots,(T_s+\text{floor}((T_e-T_s)/c)c,T_e)\}$$

Figure 7:
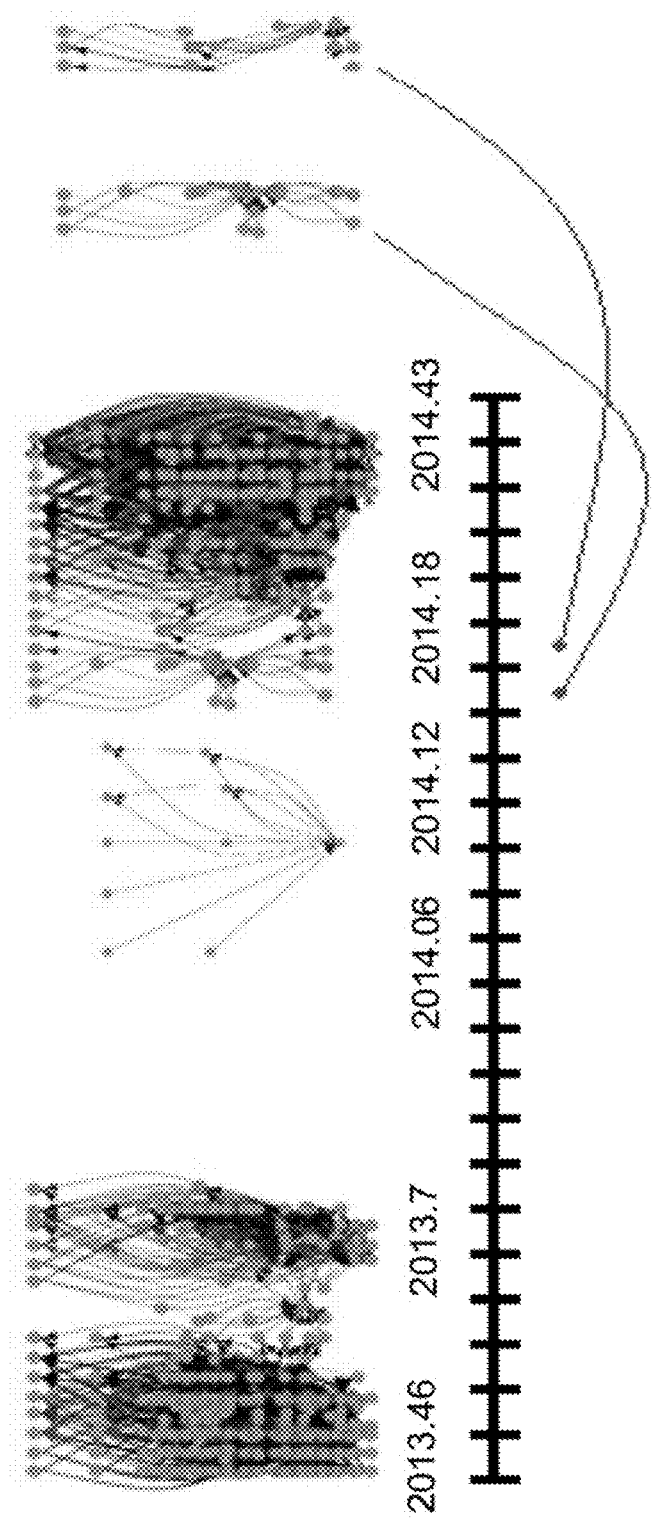
FIG. 7 is an illustration of subgraphs formed from two adjacent time intervals in the full multilayer network according to some embodiments of the present disclosure.

In order to assign a state to an interval (a,b) from the set of intervals T, first collect all events whose temporal midpoints lie within that interval. That is, if an event occurs over the time interval $(e_1,e_2)$, then the temporal midpoint $(e_2-e_1)/2$ must lie within the interval (a,b). Having collected all such events, the relations between them are determined, and the corresponding subgraph is built with colored, directed edges. The number of links of each color is counted and stored in a vector $(n_1, n_2, \ldots, n_l)$. Each of these values is compared against a threshold vector. An example of a threshold vector is (1,100,1000). The vector $(n_1, n_2, \ldots, n_l)$ is compared against this threshold vector and transformed into a vector of value abstractions. Values between 1 and 100 would be considered "low", values between 100 and 1000 would be considered "medium," and values greater than 1000 would be considered "high." With this threshold vector, the numerical vector (305,5,800,6000,8000) would be transformed into (medium,low,medium,high,high). Finally, this vector is represented more simply as (2,1,2,3,3) in which for the sake of brevity, readability, and extendibility, replace "low" with "1," "medium" with "2," and "high" with "3." FIG. 7 is an illustration of subgraphs formed from two adjacent time intervals in the full multilayer network according to some embodiments of the present disclosure.

After this process is complete, each interval $T_i$ from T will have been assigned a state $S_i$. Each pair of states $(S_i,S_{i+1})$, therefore, represents a transition from state $S_i$ to state $S_{i+1}$. In the state transition network each state S is represented by a node, and each transition (S,U) is represented by an edge. Moreover, each node S is weighted by the number of times the state S occurs, and the edge (S,U) is weighted proportionally to the number of times the transition (S,U) occurs. In order to build the state transition network, the number occurrences of each state S is counted along with the number of transitions of any pair of states (S,U). After having assigned a vector of value abstractions to each time interval, then count the number of occurrences of each state along with the number of state transitions from one state to another. The number of occurrences of a state determines the size of the state node in the state transition network, while the number of transitions determines the size of the corresponding edge in the state transition network.

Figure 8:
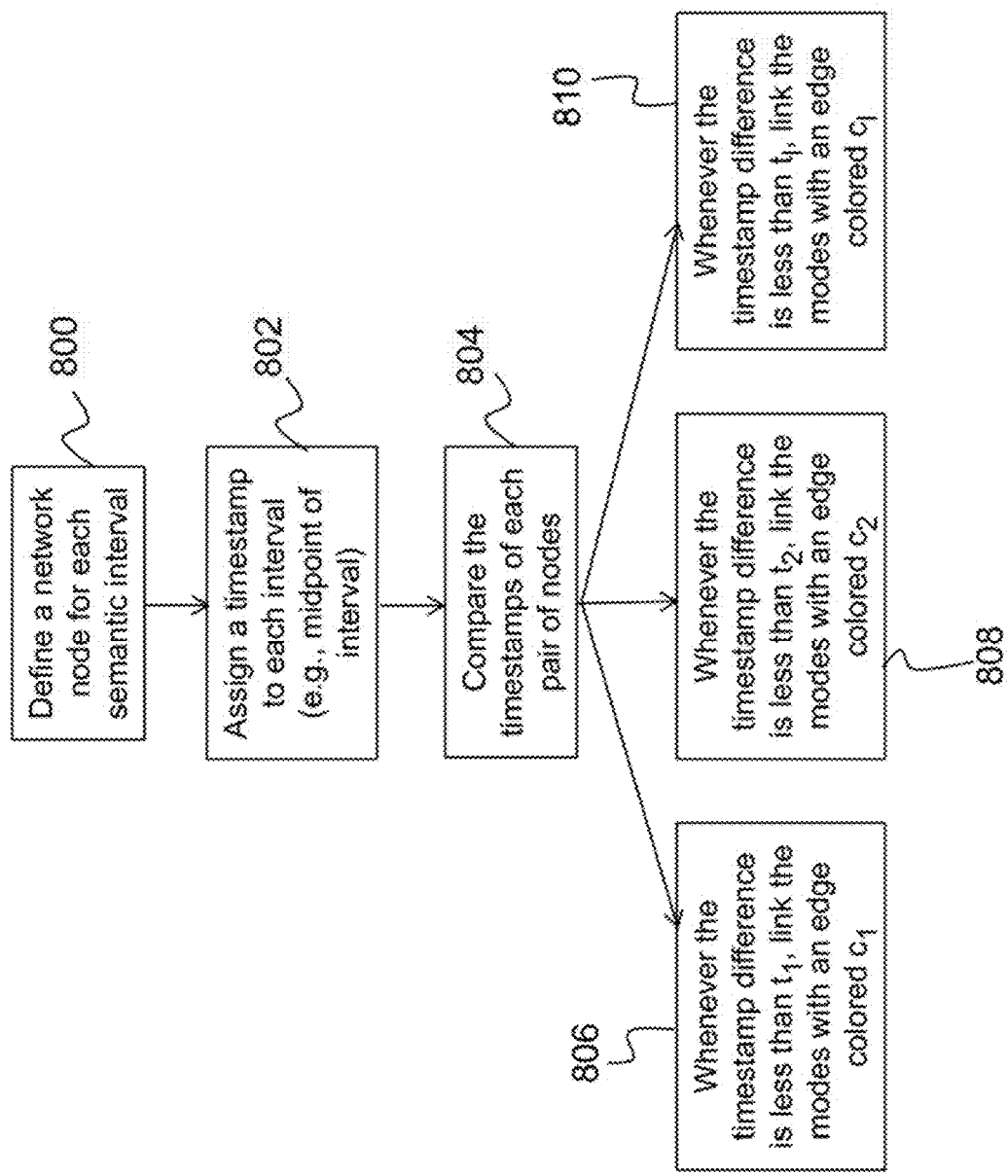
FIG. 8 is a flow diagram illustrating encoding semantic features from multiple time series into a multilayer network according to some embodiments of the present disclosure.

FIG. 8 is a flow diagram depicting encoding of semantic features from multiple time series into a multilayer network according to embodiments of the present disclosure. In a first operation 800, a network node for each semantic interval is defined. In a second operation 802, a timestamp is assigned to each interval (e.g., midpoint of interval). In a third operation 804, the timestamp of each pair of nodes is compared. Based on the comparison, whenever the timestamp difference is less than $t_1$, link the nodes with an edge colored $c_1$ (element 806). Further, whenever the timestamp difference is less than $t_2$, the modes with an edge colored $c_2$ are linked (element 808). Finally, whenever the timestamp difference is less than $t_i$, link the modes with an edge colored $c_i$ (element 810).

Figure 9:
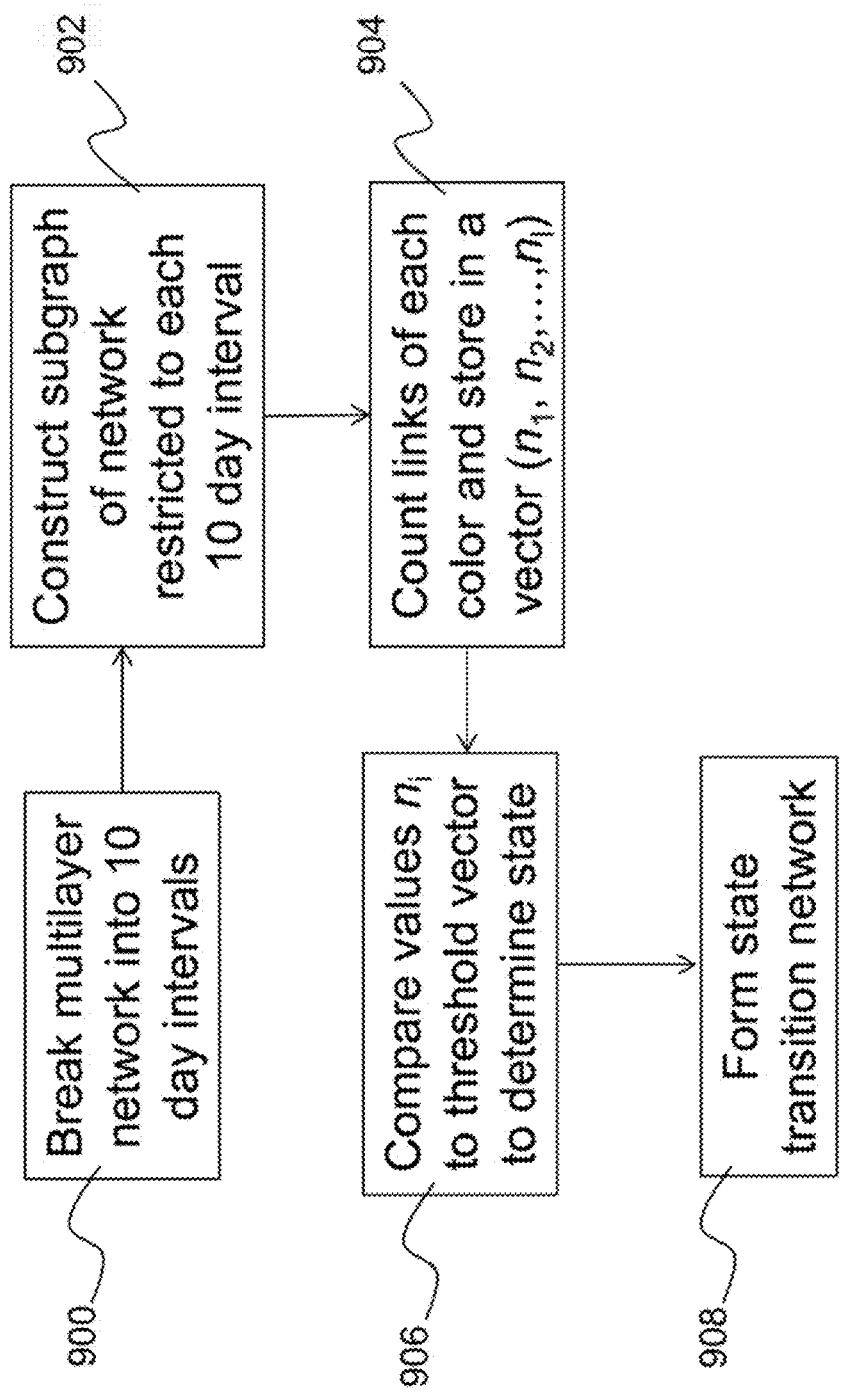
FIG. 9 is a flow diagram illustrating forming the state transition network according to some embodiments of the present disclosure.

FIG. 9 depicts forming the state transition network according to embodiments of the present disclosure. In a first operation 900, a multilayer network is divided into 10-day intervals. In a second operation 902, subgraphs of the multilayer network, which are restricted to each 10-day interval, are generated. In a third operation 904, the links of each color are counted and stored in a vector. In a fourth operation 906, the values in the vector are compared to a threshold vector to determine the state. Finally, in a fifth operation 908, a state transition network is formed.

(3.6) Notable Events/Protest Events

Periods of high, sustained activity or which correspond to real-world events are especially noteworthy, and it is desirable to characterize them within the framework of the state transition network. In order to incorporate real world events and exogenous shocks, one can replace states in specified intervals with special, additional states. For example, the GSR (Gold Standard Report) data details real-world protest events.

Figure 10:
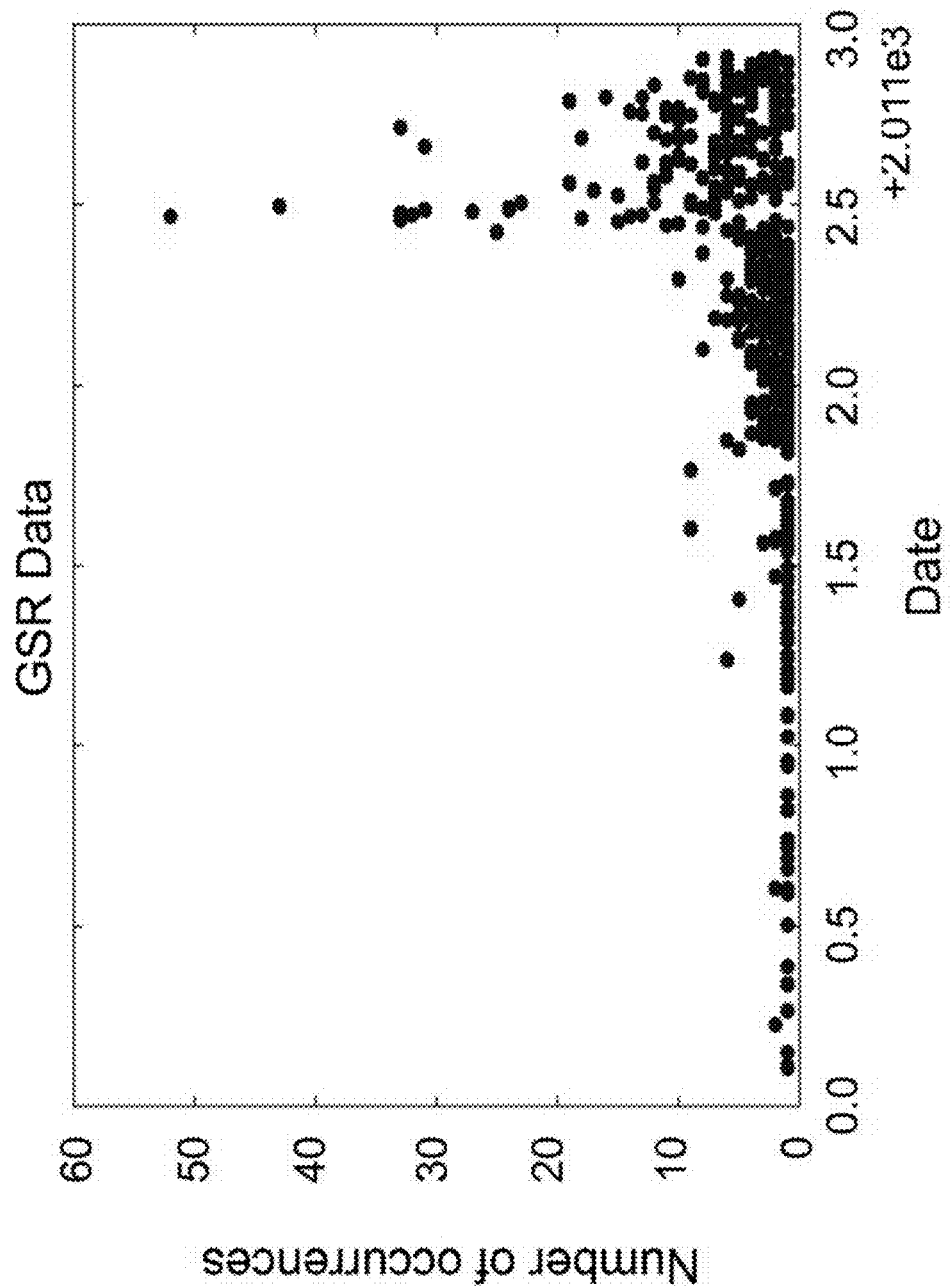
FIG. 10 is an illustration of a number of real world protests in Brazil on each day from 2011 to 2014 according to some embodiments of the present disclosure.

FIG. 10 depicts a number of real world protests in Brazil on each day from 2011 to 2014. When building the state transition network, time periods in which the number of protests is greater than 10 were tracked. Recall that when defining states to form the state transition network, the system iterated over all 10-day periods and used the number of links of each color inside that time window to determine the state. However, if the 10-day time periods intersect one of the time periods in which there are more than 10 real world protests according to the GSR data, the system ignores the number of links and consider it to be a special state.

Figure 11:
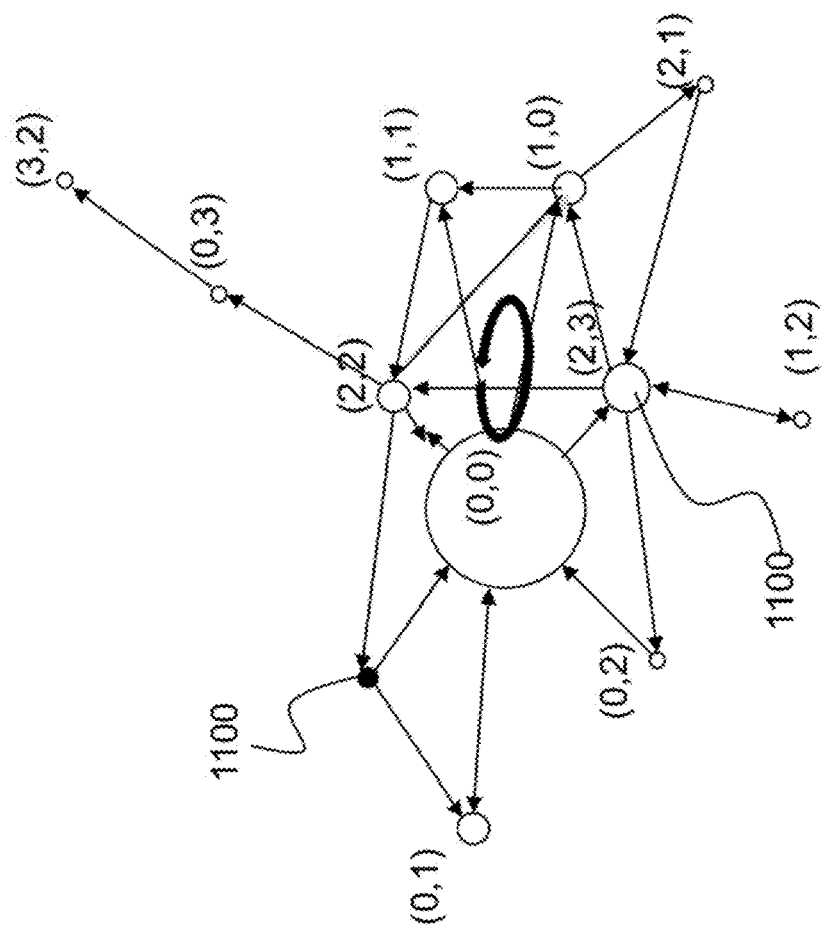
FIG. 11 is an illustration of the state transition network according to some embodiments of the present disclosure.

FIG. 11 illustrates the state transition network considering only green and red links, with the first coordinate representing green links and the second coordinate representing red links. The state (0,3), for example, represents no green links but a very high number of red links. Green nodes (represented by unfilled circles (e.g., 1100)) correspond to regular states, while the red node (represented by filled circle 1102 corresponds to the special state.

(3.7) Random Walker Model

The most straightforward way to model the underlying system using the state transition network is with a random walker. Given any starting state S, the next state is predicted by having the random walker randomly choose an adjacent state with probability proportional to the weights on the outgoing edges. However, this model is overly simplistic. For instance, it does not account for the fact that a long period of inactivity is more likely to persist than a short period of inactivity. Similarly, a spike of high activity may be more likely to die out quickly compared to sustained activity.

Figure 12:
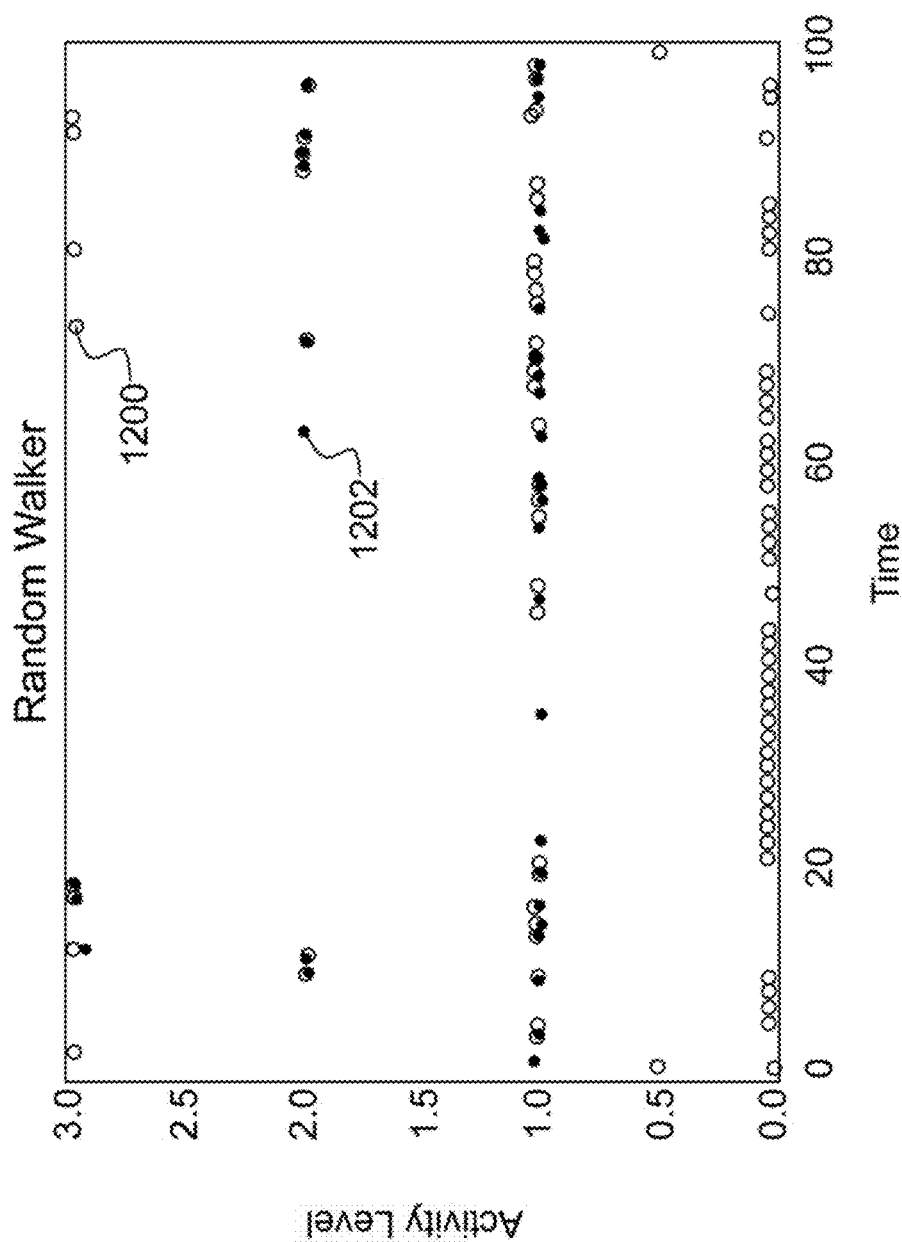
FIG. 12 is an illustration of a single simulated run of the random walker model according to some embodiments of the present disclosure.

FIG. 12 depicts a single simulated run of the random walker model according to embodiments of the present disclosure. Unfilled circles (e.g., 1200) represent the volume of green links and the filled circles (e.g., 1202) represent the volume of red links. A value of 0 represents "low," a value of 1 represents "medium," and a value of 2 represents "high". A value of 3 represents a protest event.

(3.8) Random Walker with Finite Memory

A random walker only knows it's current state, and essentially predicts the next state $S_{i+1}$ using only the current state $S_i$. To improve the accuracy, one could instead attempt to predict the state $S_{i+1}$ using the states $S_i, S_{i-1}, S_{i-2}, \ldots, S_{i-h}$, but a walker which "remembers" many previous states may be better at realistically predicting future activity.

Figure 13:
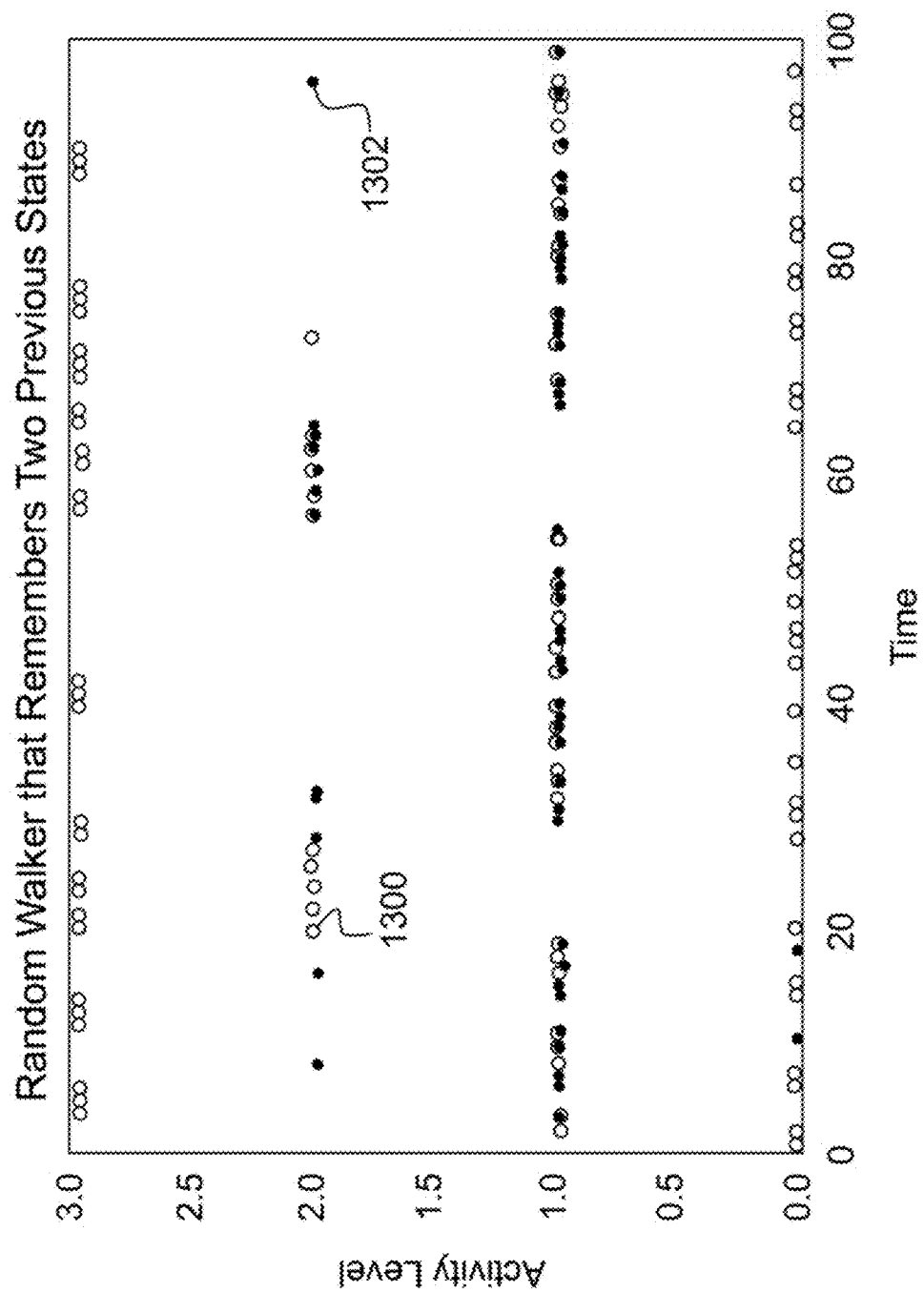
FIG. 13 is an illustration of a single simulated run of a random walker which remembers two previous states instead of just one according to some embodiments of the present disclosure.

FIG. 13 illustrates a single simulated run of a random walker which remembers two previous states instead of just one as in FIG. 12. Note that there is a greater tendency towards sustained levels of high activity when compared to FIG. 12. The random walker which only remembers one state is prone to shorter but more frequent periods of high activity. Unfilled circles (e.g., 1300) represent the volume of green links and the filled circles (e.g., 1302) represent the volume of red links. A value of 0 represents "low," a value of 1 represents "medium," and a value of 2 represents "high". A value of 3 represents a protest event.

Figure 14:
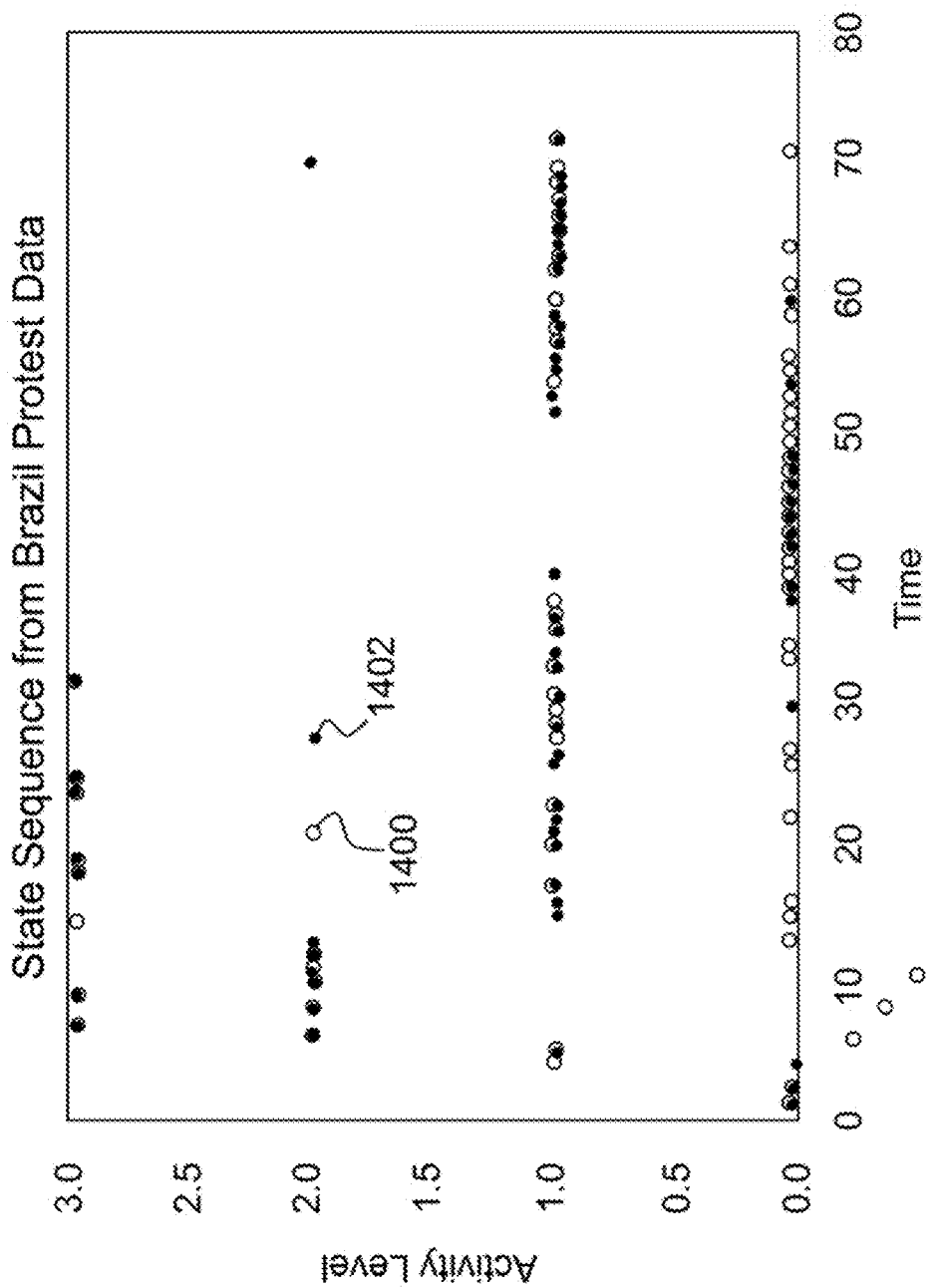
FIG. 14 is an illustration of the state sequence of the Brazil protest data according to some embodiments of the present disclosure.

FIG. 14 shows the state sequence of Brazil protest data to compare with FIGS. 12 and 13. Unfilled circles (e.g., 1400) represent the volume of green links and the filled circles (e.g., 1402) represent the volume of red links. A value of 0 represents "low," a value of 1 represents "medium," and a value of 2 represents "high". A value of 3 represents a protest event.

(3.9) State Sequences as Early Warning Signals

Figure 15:
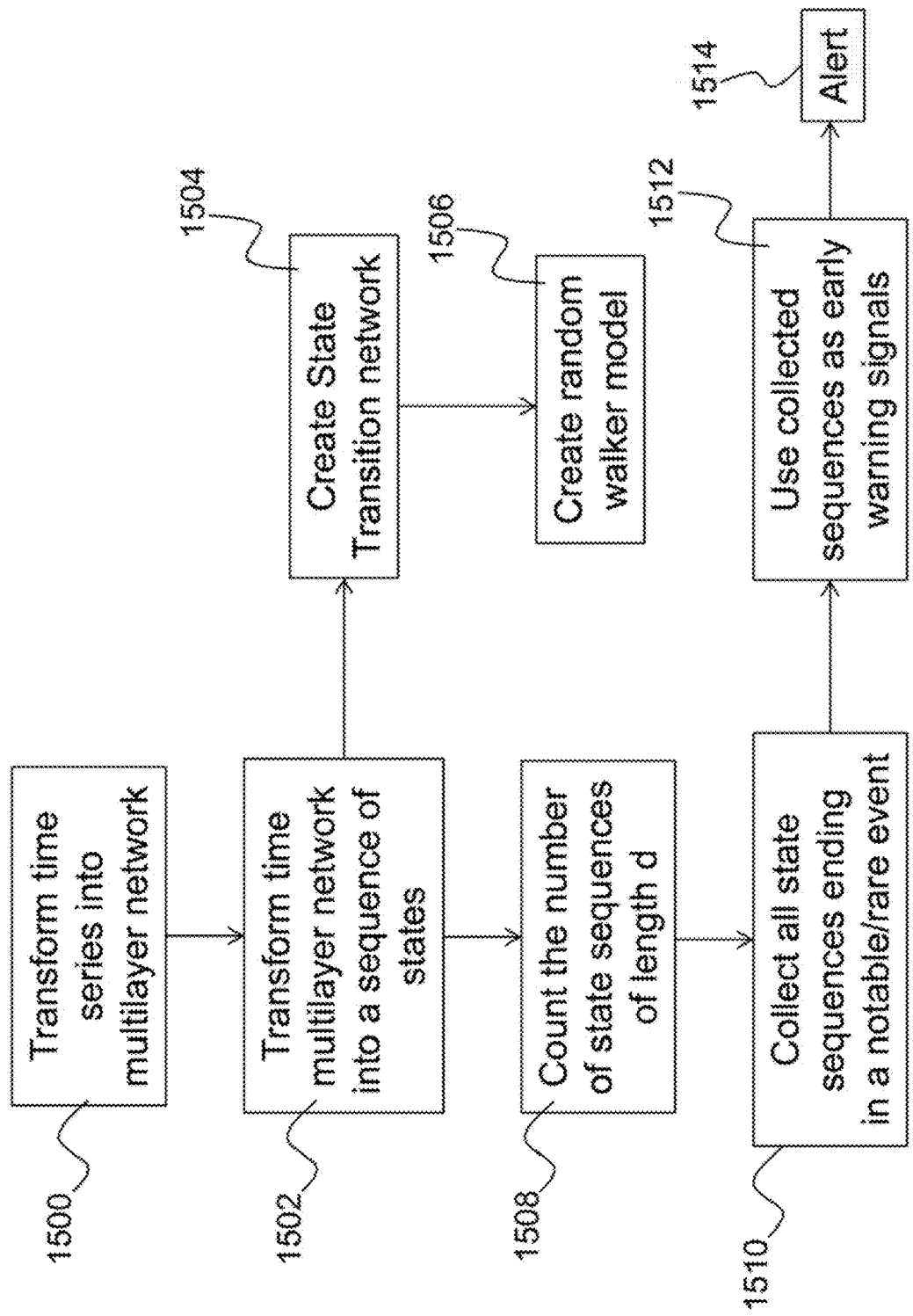
FIG. 15 is an illustration of taking as input the collection of time series and outputting early warning signals according to some embodiments of the present disclosure.

By counting all state sequences of some specified length d, at any given time the previous d−1 states can be used to place a probabilistic prediction on the following state. This corresponds directly to the method the random walker with memory uses to probabilistically choose the next state. Specifically, count the number of sequences whose first d−1 entries are the previous d−1 as observed in the system, and predict the probability of state S as the portion of those sequences whose dth entry is S. In particular, with the Brazil protest data this yields a prediction of a protest event. Hence, the sequences of length d ending in the protest event may be used as early warning signals. FIG. 15 is a flowchart showing the system described herein taking as input the collection of time series and outputting early warning signals. As shown, in a first operation 1500, the time series is transformed into a multilayer network. In a second operation 1502, the multilayer network is transformed into a sequence of states. From the sequence of states, a state transition network is created in a third operation 1504. The random walker model is created from the state transition network, as described above, in a fourth operation 1506. Additionally, from the sequence of states, the system counts the number of state sequences of length d in a fifth operation 1508. In a sixth operation 1510, all state sequences ending in a notable/rare event are collected. Then, the collected sequences from operation 1510 are used as early warning signals in a seventh operation 1512 to generate an alert 1514.

One advantage of the invention described herein with respect to previous work in this area is that multiple time series can be analyzed. This is critical in many applications in which a single time series does not represent the underlying system well. Additionally, multiple time scales are employed. This is particularly important in opinion diffusion, in which social media and real-life interactions provide for vastly different time scales. Further, multiple semantic features may be extracted, although only value abstractions are employed in the system according to embodiments of this disclosure. Non-limiting examples of systems which can apply the described process include online social networks, collective human activity in an urban environment, and collective activity of vehicles or aircraft. A single aggregated feature of all individual elements in such systems is unlikely to be sufficient to usefully describe its state at a given time, so it is necessary to consider a large number of features. For instance, rather than considering the number of vehicles which experienced a specific failure in each month, the system according to embodiments of the present disclosure can consider the number of vehicles of each model type which experienced that failure, resulting in a higher dimensional time series.

A potential commercial application of this invention is to model the diffusion of failures in a system which may occur on different time scales. This system may be a collection of individual vehicles or aircraft which may experience a variety of related failures, or it may be a more complex system of interrelated entities which can rarely undergo a cascade of smaller failures leading to a large, unexpected failure. For instance, in an online social network, an individual failure may correspond to a user retweeting a hashtag that is related to a social movement, which could culminate in a more widespread failure in the form of a large protest. Similarly, individual failures in vehicles could lead to a recall. Additionally, individuals becoming sick could result in an epidemic.

In the event that a recall on a consumer product (e.g., vehicle component) is predicted, an alert (e.g., email, text message) can be automatically sent to experts who can verify that a recall should be issued, possibly preventing deaths and saving money resulting from lawsuits. Similarly, in the case of an epidemic, early action can be taken to reduce medical costs through such actions as emergency declaration, quarantine, requesting medical aid, and developing a vaccine. Furthermore, in the case of protests resulting from a social movement, users (e.g., officials or other interested parties) who receive an early warning via an automatically generated alert (FIG. 15, element 1514) that is sent electronically via, for instance, email, text message, or a social media network, will have additional time to prepare and limit negative effects, such as violent physical altercations by ensuring appropriate security. As another example and in addition to or in lieu of such an alert, the system can interface with transportation networks to alter train or other transportation schedules that are traveling toward the geocoded location of the predicted protest. As a non-limiting example, all scheduled trains directed toward such a location can be terminated such that no trains are scheduled to bring people toward the site of the predicted protest.

Figure 16:
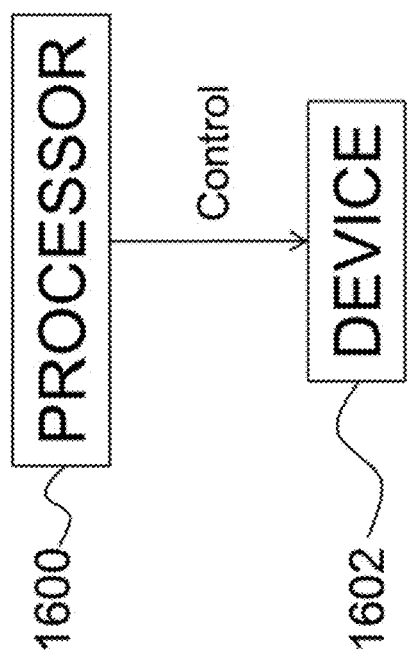

FIG. 16 is a flow diagram illustrating using a processor 1600 to control a device 1602 based on the prediction of a future event of interest. Non-limiting examples of devices 1602 that can be controlled via the processor 1600 and the prediction of a future event of interest include a vehicle or a vehicle component, such as a brake, a steering mechanism, suspension, or safety device (e.g., airbags, seatbelt tensioners, etc.) for navigation to or avoiding the site of a predicted event. Controlling the device 1602 is a final option based on the information in the prediction (e.g., for autonomous navigation). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible. Thus, the invention described herein can be applied to ground vehicles, such as emergency responders or to drones, which have multiple potential uses in an area where an event is occurring, such as monitoring, delivery of supplies, etc.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for predicting the occurrence of future events, the system comprising:
    one or more processors and a non-transitory computer-readable medium having executable instructions encoded thereon such that when executed, the one or more processors perform operations of:
        acquiring a collection of time series from social media data related to an event of interest;
        partitioning the collection of time series into a set of time intervals and extracting semantic features from the set of time intervals as a set of semantic intervals;
        encoding the semantic features into a multilayer network, resulting in an encoded network;
        transforming a set of subgraphs of the multilayer network into a state transition network;
        generating a prediction of a future event of interest by analyzing the encoded network using the state transition network; and
        using the analyzed encoded network, controlling a device based on the prediction of the future event of interest.

2. The system as set forth in claim 1, wherein each layer of the multilayer network represents a distinct time series, and wherein the multilayer network comprises nodes, which each represent an event of interest, and colored edges, wherein different colored edges represent different timescales.

3. The system as set forth in claim 1, wherein in encoding the semantic features into the multilayer network, the one or more processors further perform operations of:
    defining a node in the multilayer network for each semantic interval;
    assigning a timestamp to each semantic interval;
    comparing timestamps of each pair of nodes to determine a difference in timestamps between the pair of nodes; and
    linking each pair of nodes with an edge having a color determined based on the difference in timestamps.

4. The system as set forth in claim 3, wherein in transforming a set of subgraphs of the multilayer network into a state transition network, the one or more processors further perform operations of:
    dividing the multilayer network into a set of time intervals;
    generating a subgraph of the multilayer network restricted to each time interval, wherein each subgraph is comprised of nodes and edges linking the nodes;
    for each subgraph, determining a number of edges of each type;
    comparing the number of edges against a threshold value and assigning a state to each subgraph; and
    generating the state transition network, wherein each state is represented by a state node and each transition from one state to another is represented by an edge.

5. The system as set forth in claim 4, wherein a number of occurrences of a state determines a size of the state node in the state transition network, and a number of transitions determines a size of a corresponding edge in the state transition network.

6. The system as set forth in claim 1, wherein, using the state transition network, a random walker method with memory is used to probabilistically select a next state in the encoded network to yield a prediction of a future event of interest.

7. A computer implemented method for predicting the occurrence of future events, the method comprising an act of:
    causing one or more processors to execute instructions encoded on a non-transitory computer-readable medium, such that upon execution, the one or more processors perform operations of:
        acquiring a collection of time series from social media data related to an event of interest;
        partitioning the collection of time series into a set of time intervals and extracting semantic features from the set of time intervals as a set of semantic intervals;
        encoding the semantic features into a multilayer network, resulting in an encoded network;
        transforming a set of subgraphs of the multilayer network into a state transition network;
        generating a prediction of a future event of interest by analyzing the encoded network using the state transition network; and
        using the analyzed encoded network, controlling a device based on the prediction of the future event of interest.

8. The method as set forth in claim 7, wherein each layer of the multilayer network represents a distinct time series, and wherein the multilayer network comprises nodes, which each represent an event of interest, and colored edges, wherein different colored edges represent different timescales.

9. The method as set forth in claim 7, wherein in encoding the semantic features into the multilayer network, the one or more processors further perform operations of:
    defining a node in the multilayer network for each semantic interval;
    assigning a timestamp to each semantic interval;

comparing timestamps of each pair of nodes to determine a difference in timestamps between the pair of nodes; and linking each pair of nodes with an edge having a color determined based on the difference in timestamps.

10. The method as set forth in claim 9, wherein in transforming a set of subgraphs of the multilayer network into a state transition network, the one or more processors further perform operations of:

dividing the multilayer network into a set of time intervals;

generating a subgraph of the multilayer network restricted to each time interval, wherein each subgraph is comprised of nodes and edges linking the nodes;

for each subgraph, determining a number of edges of each type;

comparing the number of edges against a threshold value and assigning a state to each subgraph; and generating the state transition network, wherein each state is represented by a state node and each transition from one state to another is represented by an edge.

11. The method as set forth in claim 10, wherein a number of occurrences of a state determines a size of the state node in the state transition network, and a number of transitions determines a size of a corresponding edge in the state transition network.

12. The method as set forth in claim 7, wherein, using the state transition network, a random walker method with memory is used to probabilistically select a next state in the encoded network to yield a prediction of a future event of interest.

13. A computer program product for predicting the occurrence of future events, the computer program product comprising:

computer-readable instructions stored on a non-transitory computer-readable medium that are executable by a computer having one or more processors for causing the processor to perform operations of:

acquiring a collection of time series from social media data related to an event of interest;

partitioning the collection of time series into a set of time intervals and extracting semantic features from the set of time intervals as a set of semantic intervals;

encoding the semantic features into a multilayer network, resulting in an encoded network;

transforming a set of subgraphs of the multilayer network into a state transition network;

generating a prediction of a future event of interest by analyzing the encoded network using the state transition network; and using the analyzed encoded network, controlling a device based on the prediction of the future event of interest.

14. The computer program product as set forth in claim 13, wherein each layer of the multilayer network represents a distinct time series, and wherein the multilayer network comprises nodes, which each represent an event of interest, and colored edges, wherein different colored edges represent different time-scales.

15. The computer program product as set forth in claim 13, wherein in encoding the semantic features into the multilayer network, the computer program product further comprises instructions for causing the one or more processors to further perform operations of:

defining a node in the multilayer network for each semantic interval;

assigning a timestamp to each semantic interval;

comparing timestamps of each pair of nodes to determine a difference in timestamps between the pair of nodes; and linking each pair of nodes with an edge having a color determined based on the difference in timestamps.

16. The computer program product as set forth in claim 15, wherein in transforming a set of subgraphs of the multilayer network into a state transition network, the computer program product further comprises instructions for causing the one or more processors to further perform operations of:

dividing the multilayer network into a set of time intervals;

generating a subgraph of the multilayer network restricted to each time interval, wherein each subgraph is comprised of nodes and edges linking the nodes;

for each subgraph, determining a number of edges of each type;

comparing the number of edges against a threshold value and assigning a state to each subgraph; and generating the state transition network, wherein each state is represented by a state node and each transition from one state to another is represented by an edge.

17. The computer program product as set forth in claim 16, wherein a number of occurrences of a state determines a size of the state node in the state transition network, and a number of transitions determines a size of a corresponding edge in the state transition network.

18. The computer program product as set forth in claim 13, wherein, using the state transition network, a random walker method with memory is used to probabilistically select a next state in the encoded network to yield a prediction of a future event of interest.

19. The system as set forth in claim 1, wherein the alert is sent electronically via at least one of email, text message, and a social media network.

20. The method as set forth in claim 7, wherein the alert is sent electronically via at least one of email, text message, and a social media network.

* * * * *